US012728576B2

(12) United States Patent
Nakamura et al.

(10) Patent No.: US 12,728,576 B2
(45) Date of Patent: Sep. 8, 2026

(54) INJECTION DEVICE

(71) Applicant: FANUC CORPORATION, Minamitsuru-gun (JP)

(72) Inventors: Kyousuke Nakamura, Minamitsuru-gun (JP); Akira Oomori, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 216 days.

(21) Appl. No.: 18/034,954

(22) PCT Filed: Oct. 29, 2021

(86) PCT No.: PCT/JP2021/039937

§ 371 (c)(1),
(2) Date: May 2, 2023

(87) PCT Pub. No.: WO2022/097571

PCT Pub. Date: Dec. 5, 2022

(65) Prior Publication Data

US 2024/0017459 A1 Jan. 18, 2024

(30) Foreign Application Priority Data

Nov. 4, 2020 (JP) ................................ 2020-184484

(51) Int. Cl.
*B29C 45/58* (2006.01)
*B29C 45/53* (2006.01)

(52) U.S. Cl.
CPC ............ *B29C 45/586* (2013.01); *B29C 45/53* (2013.01)

(58) Field of Classification Search
CPC ....... B29C 45/47; B29C 45/53; B29C 45/586; B29C 48/254; B29C 2045/2732; B29C 2045/2762; B29C 2045/2889; A61M 39/24; B65D 83/761; B65D 1/0246; B65D 41/0471; B01D 35/147; B01D 35/153
See application file for complete search history.

(56) References Cited

U.S. PATENT DOCUMENTS

2008/0156183 A1* 7/2008 Brittingham ............ F41A 21/30 89/14.4
2011/0241238 A1* 10/2011 Trakas .................. F16K 31/122 251/63.5

FOREIGN PATENT DOCUMENTS

CN 109228148 A * 1/2019 ........... B29C 45/231
DE 102019107235 A1 9/2020

(Continued)

OTHER PUBLICATIONS

Machine translation of CN109228148A (Year: 2019).*

(Continued)

*Primary Examiner* — Ariella Machness
(74) *Attorney, Agent, or Firm* — Sughrue Mion, PLLC

(57) ABSTRACT

An injection device comprises: a plunger provided inside a barrel and a nozzle; a seal provided rearward of an injection inlet for the nozzle to prevent a molding material from flowing rearward; and a seal case that holds the seal. The seal case is fixed by the barrel and the nozzle, and has a first inner radial surface that forms a first inner radial hollow section for the plunger to penetrate, and a second inner radial surface that forms a second inner radial hollow section into which the seal is fitted. At least a portion of the first inner radial surface has a female thread section formed thereon.

12 Claims, 10 Drawing Sheets

(56) References Cited

FOREIGN PATENT DOCUMENTS

| | | | |
|---|---|---|---|
| JP | 48-025048 | U | 3/1973 |
| JP | 60-109917 | U | 7/1985 |
| JP | 02-034318 | A | 2/1990 |
| JP | 03-125953 | U | 12/1991 |
| JP | 06-086912 | U | 12/1994 |
| JP | 2017-170502 | A | 9/2017 |

OTHER PUBLICATIONS

Merriam Webster Definition for “Accommodate”, https://www.merriam-webster.com/dictionary/accommodate, accessed Aug. 29, 2025. (Year: 2025).*

International Search Report for PCT/JP2021/039937 dated Nov. 30, 2021 (PCT/ISA/210).

Communication issued Jul. 9, 2025 in German Application No. 112021004541.5.

* cited by examiner

MOLDING MATERIAL CHARGING DEVICE

SERVOMOTOR

SERVOMOTOR

CONTROLLER

FRONT ⟷ REAR

FIG. 2

14
14a
24d
74
24e
24b
24a
24
24c
F2
F1
72
16b
16
Fb
Fa
16a
FRONT
REAR 10
52
50
44
48
46
42
14
144
142
14b
24d
74
72
24
40
Fb
Fa
28
14a
12
26
82
70
80a
80
80c
SERVOMOTOR
SERVOMOTOR
CONTROLLER
62
60
64
FRONT
REAR

FIG. 6

INJECTION DEVICE

CROSS REFERENCE TO RELATED APPLICATIONS

This application is a National Stage of International Application No. PCT/JP2021/039937 filed Oct. 29, 2021, claiming priority based on Japanese Patent Application No. 2020-184484 filed Nov. 4, 2020.

TECHNICAL FIELD

The present invention relates to an injection device for injecting molding material.

BACKGROUND ART

An injection molding machine performs molding by injecting raw material resin into a mold. JP H06-086912 U discloses an extruder. In this extruder, a sealing member is used to prevent leakage of the raw material resin to the outside.

SUMMARY OF THE INVENTION

However, it is not always easy to remove the sealing member from the extruder disclosed in JP H06-086912 U. As a result, it sometimes took time to perform maintenance such as inspection and replacement of the sealing member. In addition, there was a case where the sealing member was damaged when the sealing member was removed. That is, it is the task for the injection device to facilitate the removal of the sealing member.

The present invention has the object of achieving the aforementioned task.

According to an aspect of the present invention, there is provided an injection device that performs molding by injecting molding material into a mold from a nozzle member provided at a distal end of a barrel, the injection device comprising: a plunger disposed in an internal bore of the barrel and an internal bore of the nozzle member, and movable in a front-rear direction along an axial direction; a feed throat provided in the nozzle member in order for the molding material to be fed into the internal bore of the nozzle member; a seal having an annular shape, provided rearward of the feed throat, and configured to prevent the molding material fed from the feed throat from flowing rearward along the plunger; and a seal housing configured to hold the seal, the seal housing having a tubular shape and an outer diameter larger than a diameter of each of the internal bores. The seal housing is fixed by the barrel and the nozzle member attached to the barrel, and includes: a first inner surface forming a first internal bore through which the plunger passes; and a second inner surface forming a second internal bore in which the seal is held, the second internal bore having a larger diameter than the first internal bore and being coaxial with the first internal bore. An internally threaded portion having a larger diameter than the plunger is formed in at least a part of the first inner surface.

According to another aspect of the present invention, there is provided an injection device that performs molding by injecting molding material into a mold from a nozzle provided at a distal end of a barrel, the injection device comprising: a screw disposed in an internal bore of the barrel, and movable in a front-rear direction along an axial direction; a feed throat provided in the barrel in order for the molding material to be fed into the internal bore of the barrel; a seal having an annular shape, provided rearward of the feed throat, and configured to prevent the molding material fed from the feed throat from flowing rearward along the screw; and a seal housing configured to hold the seal, the seal housing having a tubular shape and an outer diameter larger than a diameter of the internal bore of the barrel. The seal housing is fixed by the barrel and includes: a first inner surface forming a first internal bore through which the screw passes; and a second inner surface forming a second internal bore in which the seal is held, the second internal bore having a larger diameter than the first internal bore and being coaxial with the first internal bore. An internally threaded portion having a larger diameter than the screw is formed in at least a part of the first inner surface.

According to the present invention, it is possible to provide an injection device in which the seal can be easily removed.

BRIEF DESCRIPTION OF DRAWINGS

FIG. 1 is a view showing an injection molding machine according to a first embodiment;

FIG. 2 is an enlarged view showing a part of an injection device according to the first embodiment;

FIG. 6 is a view showing the seal housing according to a first modification;

DETAILED DESCRIPTION OF THE INVENTION

Figure 3:
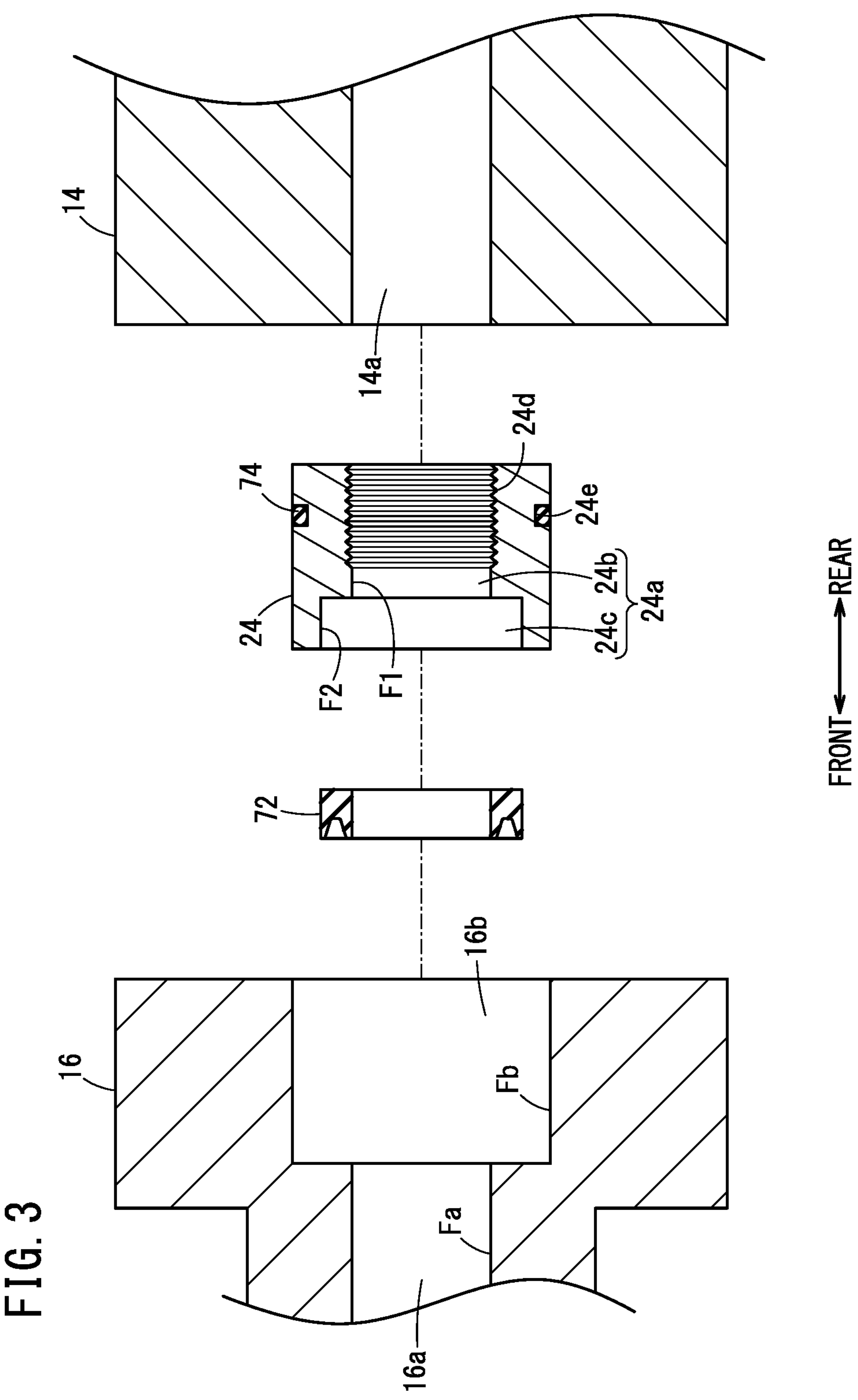
FIG. 3 is a view showing a state in which a seal and a seal housing are separated from a nozzle adapter.

Preferred embodiments of an injection device according to the present invention will be described in detail below with reference to the accompanying drawings.

An injection molding machine includes a machine base, a mold clamping device, and an injection device. The mold clamping device and the injection device are installed on the machine base so as to face each other. The mold clamping device includes a mold that can be opened and closed. The injection device includes a barrel and a nozzle. The injection molding machine executes a molding cycle under the control of a controller. The molding cycle is a process of performing molding by injecting the molding material into the mold from the nozzle at the distal end of the barrel. The molding cycle includes a metering process and an injection process. The injection molding machine of the present embodiment is characterized by the injection device. Therefore, the injection device will be described in detail, and description of the other components will be omitted.

First Embodiment

Figure 1:
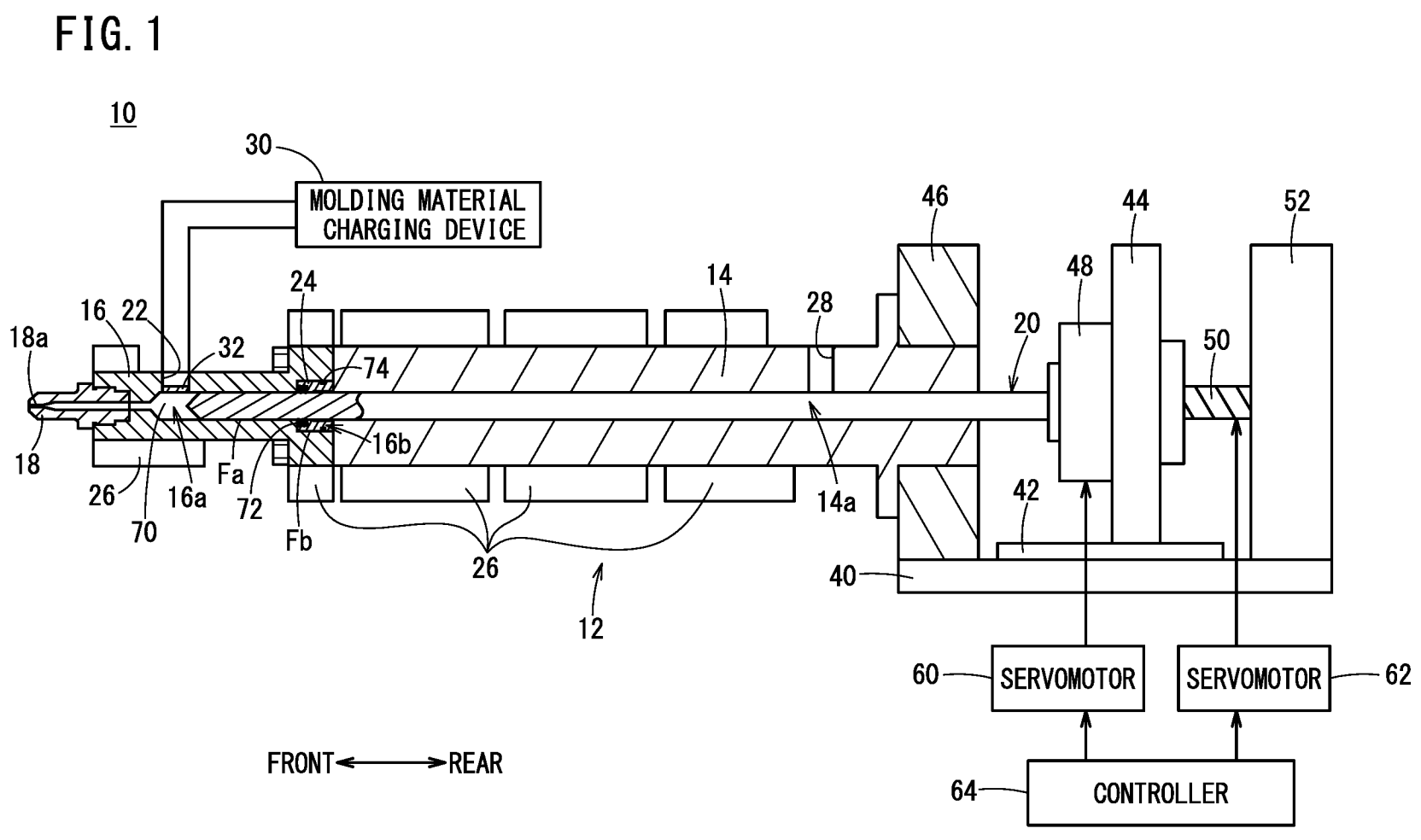

The injection device according to a first embodiment will be described. FIG. 1 is a view showing an injection molding machine 10 according to the first embodiment. In FIG. 1, the configuration of an injection device 12 is mainly shown, and the illustration of the machine base and the mold clamping device is omitted.

The injection device 12 includes a barrel 14, a nozzle 18, and a plunger 20. The nozzle 18 is attached to the distal end of the barrel 14 via a nozzle adapter 16. The plunger 20 is disposed inside the barrel 14 and the nozzle adapter 16. The plunger 20 is movable in the front-rear direction and rotatable about the front-rear direction (rotatable about the axis of the plunger 20). The barrel 14, the nozzle adapter 16, and the nozzle 18 function as a cylinder for injecting molding material. Further, the nozzle adapter 16 and the nozzle 18 function as a nozzle member. An internal bore 14*a* is formed in the barrel 14. The internal bore 14*a* allows the plunger 20 to move in the front-rear direction. In addition, an internal bore 16*a* is formed in the nozzle adapter 16. The internal bore 16*a* allows the plunger 20 to move in the front-rear direction. In order to inject the molding material into the mold of the mold clamping device, the nozzle 18 includes a nozzle hole 18*a*. The nozzle hole 18*a* communicates with the internal bore 16*a* of the nozzle adapter 16. The internal bore 16*a* of the nozzle adapter 16 communicates with the internal bore 14*a* of the barrel 14. The internal bore 14*a* and the internal bore 16*a* preferably have the same inner diameter. A direction in which the plunger 20 moves toward the mold (that is, toward the nozzle 18) is referred to as a forward direction. In addition, a direction in which the plunger 20 moves toward a side opposite to the mold (that is, toward a side opposite to the nozzle 18) is referred to as a rearward direction.

A feed throat 22 is formed in the nozzle adapter 16. The feed throat 22 is a hole for feeding the liquid molding material into the internal bore 16*a* of the nozzle adapter 16 in front of the plunger 20. A seal housing 24 is accommodated in the nozzle adapter 16 behind the feed throat 22. The seal housing 24 holds a seal 72. The seal 72 prevents the molding material fed from the feed throat 22 from flowing rearward (prevents backflow of the molding material). The seal housing 24 facilitates removal of the seal 72 from injection molding machine 10. The details will be described later.

A temperature control device 26 is provided on the outer circumferential surfaces of the barrel 14 and the nozzle adapter 16. The temperature control device 26 controls the temperature of the molding material in the nozzle adapter 16 and the barrel 14.

A hole 28 is provided on the proximal end side of the barrel 14. The hole 28 communicates with the internal bore 14*a*. Accordingly, even when gas is generated from the molding material or even when air is entrained in the molding material, the gas or the air can be discharged from the hole 28. As a result, it is possible to reduce occurrence of molding defects due to silver streaks, air bubbles, or the like.

A molding material charging device 30 of the injection molding machine 10 generates a filling pressure by using driving force or the like caused by a pneumatic, hydraulic, or electric motor. The molding material charging device 30 feeds the molding material to the front of the plunger 20 from the feed throat 22 by using the filling pressure. It is preferable to provide a check valve 32 in the feed throat 22. This is to prevent the molding material fed into the internal bore 16*a* from flowing backward from the feed throat 22 to the outside (into the molding material charging device 30).

The injection device 12 includes a base 40, a linear guide 42, and a pusher plate 44. The base 40 is disposed on the machine base so as to be movable in the front-rear direction with respect to the machine base. The linear guide 42 is fixed to the base 40. The pusher plate 44 is supported by the linear guide 42 so as to be movable in the front-rear direction with respect to the base 40. The proximal end portion of the barrel 14 is fixed to the base 40 via a front plate 46. The pusher plate 44 rotatably supports the proximal end portion of the plunger 20. A rotary pulley 48 is provided at the proximal end of the plunger 20. As the rotary pulley 48 rotates, the plunger 20 rotates about the axial direction of the plunger 20 (the barrel 14) (about the front-rear direction).

Further, a ball screw 50 is screwed into the pusher plate 44. A rear plate 52 is fixed to the base 40. The rear plate 52 rotatably supports the ball screw 50 at the proximal end of the ball screw 50. As the ball screw 50 rotates, the pusher plate 44 moves in the front-rear direction while being guided by the linear guide 42. That is, the ball screw 50 and the pusher plate 44 convert a rotational motion of the ball screw 50 into a linear motion. Along with the movement of the pusher plate 44 in the front-rear direction, the plunger 20 moves in the front-rear direction with respect to the barrel 14.

The injection molding machine 10 includes a servomotor 60, a servomotor 62, and a controller 64, in addition to the molding material charging device 30. The servomotor 60 rotates the plunger 20. The servomotor 62 moves the plunger 20 in the front-rear direction. The controller 64 controls the servomotor 60 and the servomotor 62. The rotational driving force of the servomotor 60 is transmitted to the rotary pulley 48 via an unillustrated transmission mechanism (an endless belt, a pulley, or the like). As a result, the rotary pulley 48 rotates, and the plunger 20 also rotates. Further, the rotational driving force of the servomotor 62 is transmitted to the ball screw 50 via an unillustrated transmission mechanism (an endless belt, a pulley, or the like). As a result, when the ball screw 50 rotates, the pusher plate 44 and the plunger 20 move in the front-rear direction.

In the metering process of the molding cycle, the controller 64 controls the servomotor 62 to move the plunger 20 backward, whereby the controller 64 meters the molding material. At this time, the molding material charging device 30 feeds the molding material from the feed throat 22 under the control of the controller 64. During metering, the molding material flows (is fed) from the feed throat 22 into a space 70 (metering chamber). The space 70 is located forward of the plunger 20 and is formed between the internal bore 16*a* of the nozzle adapter 16 and the plunger 20. After completion of the metering process, the controller 64 brings the nozzle 18 into contact with the mold by moving the entire injection device 12 forward. Thereafter, the controller 64 performs injection control. That is, by moving the plunger 20 forward, the controller 64 performs injection control for injecting the metered molding material toward the mold. The metered molding material refers to the molding material that is in the space 70. This injection control is performed by controlling the servomotor 62.

(Details of Seal Housing 24)

Figure 2:
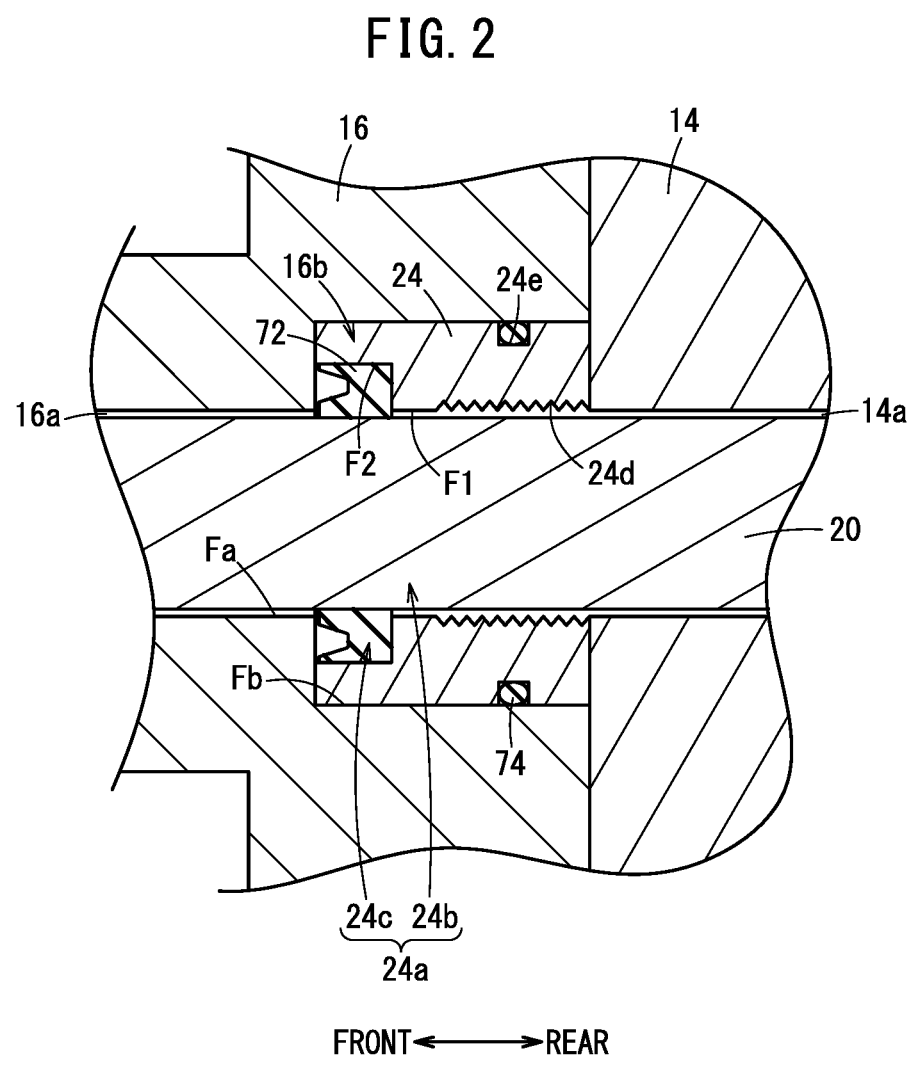

Hereinafter, the seal housing 24 will be described in detail. FIG. 2 is an enlarged view showing a part of the injection device 12 according to the first embodiment. Here, the vicinity of the seal housing 24 is shown in an enlarged manner. FIG. 3 is a view showing a state in which the seal 72 and the seal housing 24 are separated from the nozzle adapter 16.

As shown in FIGS. 2 and 3, the seal housing 24 is fixed by the barrel 14 and the nozzle adapter 16. Here, as shown in FIG. 3, the seal housing 24 is accommodated in an accommodating bore 16*b* (second accommodating bore) so as to be insertable and removable. Further, the seal housing 24 is held in the accommodating bore 16*b* by the front end portion of the barrel 14. The accommodating bore 16*b* is formed in the rear end portion of the nozzle adapter 16. The nozzle adapter 16 and the barrel 14 are fastened to each other by bolts or the like (not shown).

The seal 72 has an annular shape and prevents backflow of the molding material as described above. Specifically, the seal 72 prevents the molding material from flowing rearward along the plunger 20. That is, the seal 72 prevents the molding material from flowing through a clearance between an inner surface Fa of the internal bore 16*a* and an outer circumferential surface of the plunger 20. The seal housing 24 has a tubular shape. The seal housing 24 has an outer diameter larger than the inner diameter of the internal bore 14*a* of the barrel 14 and the inner diameter of the internal bore 16*a* of the nozzle adapter 16.

As shown in FIG. 2, the plunger 20 passes through the seal housing 24. An internal bore 24*a* of the seal housing 24 includes an internal bore 24*b* (first internal bore), and an internal bore 24*c* (second internal bore). The plunger 20 passes through the internal bore 24*b*. The internal bore 24*b* is formed by an inner surface F1 (first inner surface). Note that the inner diameter of the internal bore 24*b* may be equal to the inner diameter of the internal bore 16*a* or the inner diameter of the internal bore 14*a*. The internal bore 24*c* is disposed at the end portion of the seal housing 24 (here, the front end portion of the seal housing 24). The seal 72 is held in the internal bore 24*c*. The internal bore 24*c* is coaxial with the internal bore 24*b*. The internal bore 24*c* has a larger inner diameter than the internal bore 24*b*. The internal bore 24*c* is formed by an inner surface F2 (second inner surface). An internally threaded portion 24*d* is formed in at least a part of the inner surface F1 of the internal bore 24*b* (here, the rear end portion of the internal bore 24*b*). The internally threaded portion 24*d* has an inner diameter larger than the outer diameter of the plunger 20. This makes it easy to remove the seal 72 from the injection device 12 as will be described later.

An O-ring 74 may be provided on the outer circumferential surface of the seal housing 24. The O-ring 74 prevents the molding material from flowing rearward through a clearance between an inner surface Fb of the accommodating bore 16*b* of the nozzle adapter 16 and the outer circumferential surface of the seal housing 24. Further, an annular groove 24*e* is formed in the outer circumferential surface of the seal housing 24. The groove 24*e* holds the O-ring 74. Since the seal housing 24 includes the groove 24*e* for holding the O-ring 74, the O-ring 74 can be removed from the injection device 12 together with the seal housing 24.

Note that a plurality of the O-rings 74 may be used. That is, by providing the plurality of O-rings 74 on the outer circumferential surface of the seal housing 24, the backflow of the molding material can be more effectively prevented. In this case, by forming a plurality of the grooves 24*e* in the outer circumferential surface of the seal housing 24, the plurality of O-rings 74 can be held in the plurality of grooves 24*e*, respectively.

The removal of the seal 72 from the injection device 12 will be described. For example, at the time of maintenance of the seal 72, a removal bolt (male screw) is screwed into the internally threaded portion 24*d* of the seal housing 24. As a result, the removal bolt can be used as a handle for the seal housing 24. First, by separating the barrel 14 and the nozzle adapter 16 from each other, for example, the rear end of the seal housing 24 is exposed from the rear end of the nozzle adapter 16. Thereafter, the removal bolt is screwed into the internally threaded portion 24*d* of the seal housing 24, and the removal bolt is pulled. This makes it possible to remove the seal 72 from the nozzle adapter 16 together with the seal housing 24. That is, it becomes easy to remove the seal 72 from the injection device 12. As a result, the time required for removing the seal 72 can be shortened. In addition, it is possible to prevent the seal 72 from being damaged due to an excessive load applied to the seal 72 while being removed.

Second Embodiment

Figure 4:
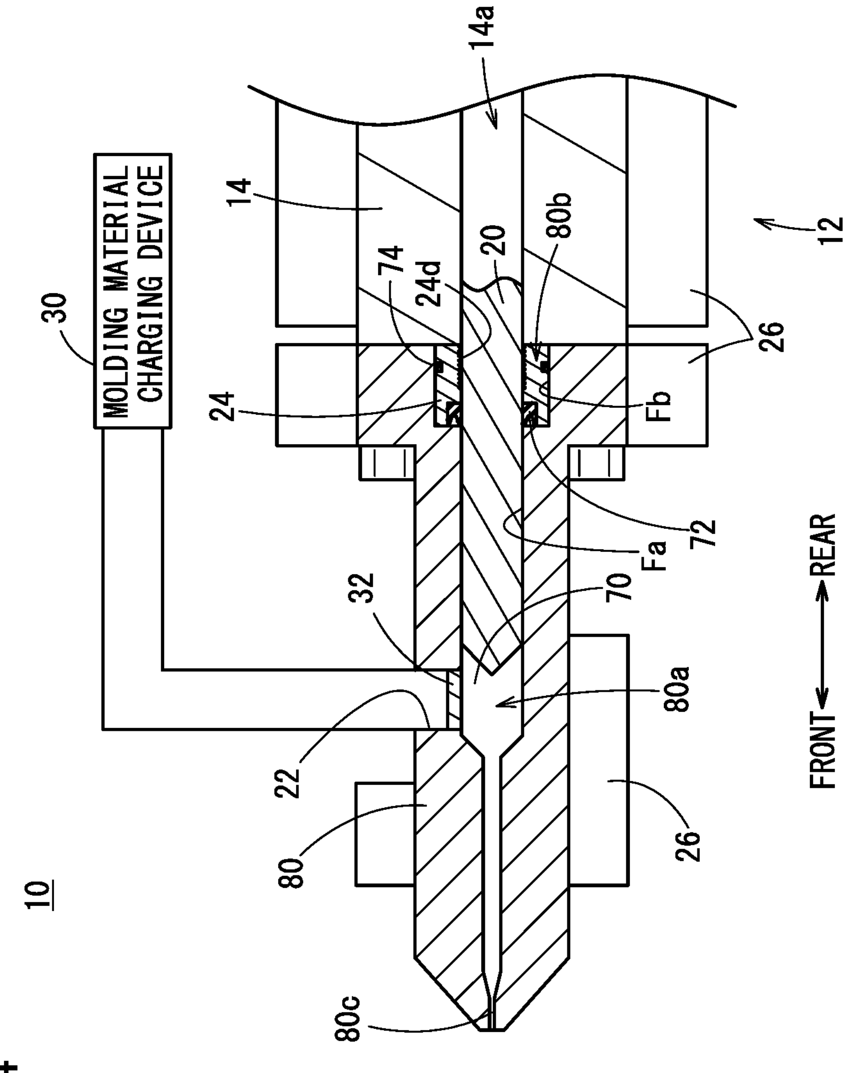
FIG. 4 is a view showing the injection molding machine according to a second embodiment.

The injection device 12 according to a second embodiment will be described. FIG. 4 is a view showing the injection molding machine 10 according to the second embodiment. Here, for ease of understanding, the vicinity of the seal housing 24 is shown in an enlarged manner. It should be noted that the same elements as those of the first embodiment are denoted by the same reference numerals, and description thereof will be omitted.

The injection device 12 according to the second embodiment includes a nozzle 80 instead of the nozzle adapter 16 and the nozzle 18 of the first embodiment. The nozzle 80 functions as a nozzle member. The nozzle 80 is provided directly at the distal end of the barrel 14. The nozzle 80 and the barrel 14 are fastened to each other by bolts or the like (not shown). The barrel 14 and the nozzle 80 function as a cylinder for injecting the molding material. The injection device 12 molds the molding material by injecting the molding material into a mold (not shown) from a nozzle hole 80*c* of the cylinder (the nozzle 80). The plunger 20 is provided inside the cylinder (specifically, inside the internal bore 14*a* and an internal bore 80*a*). The plunger 20 is movable in the front-rear direction along the axial direction. The feed throat 22 is provided in the nozzle 80. The feed throat 22 is a hole for feeding the molding material into the internal bore 80*a* of the nozzle 80. An accommodating bore 80*b* (first accommodating bore) in which the seal housing 24 is accommodated is formed in the rear end portion of the nozzle 80. The seal housing 24 can be inserted into and removed from the accommodating bore 80*b* formed in the rear end portion of the nozzle 80.

The seal 72 can be removed from the injection device 12 as follows. First, by separating the barrel 14 and the nozzle 80 from each other, for example, the rear end of the seal housing 24 is exposed from the rear end of the nozzle 80. Thereafter, the removal bolt is screwed into the internally threaded portion 24*d* of the seal housing 24, and the removal bolt is pulled. This makes it possible to remove the seal 72 from the nozzle 80 together with the seal housing 24.

Since the second embodiment is substantially the same as the first embodiment except for the above features, a detailed description thereof will be omitted.

Third Embodiment

Figure 5:
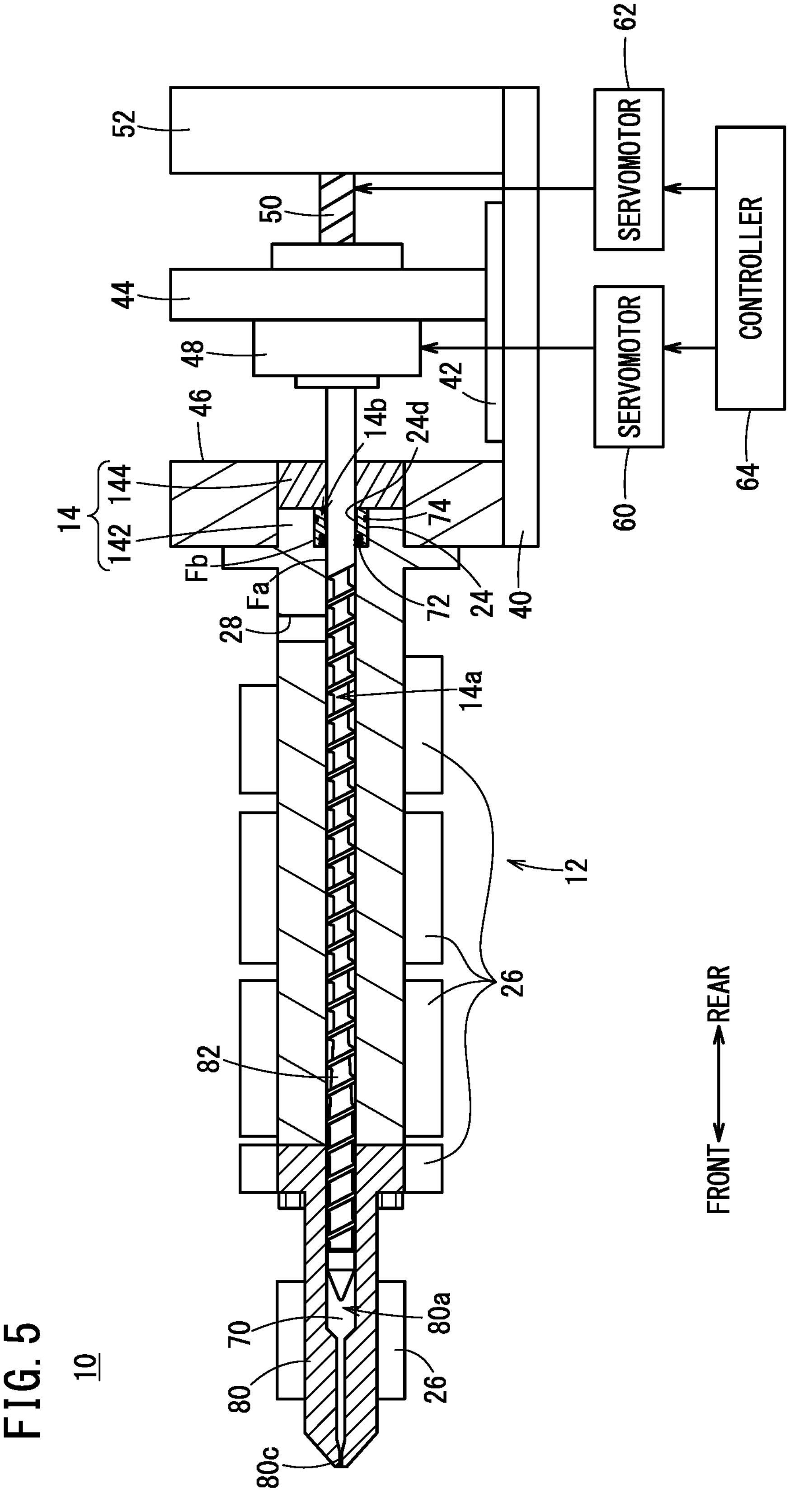
FIG. 5 is a view showing the injection molding machine according to a third embodiment.

The injection device 12 according to a third embodiment will be described. FIG. 5 is a view showing the injection molding machine 10 according to the third embodiment. It should be noted that the same elements as those of the second embodiment are denoted by the same reference numerals, and description thereof will be omitted.

The injection device 12 according to the third embodiment includes a screw 82 instead of the plunger 20 of the second embodiment, and does not include the feed throat 22 and the molding material charging device 30. The screw 82 is provided inside the internal bore 14*a* and the internal bore 80*a*, is movable in the front-rear direction along the axial direction, and is rotatable about the axis thereof. A configuration corresponding to the first embodiment may be adopted by using the nozzle adapter 16 and the nozzle 18 instead of the nozzle 80.

Here, the hole 28 provided in the barrel 14 is used as a feed throat. That is, the molding material is fed from the hole 28 into the internal bore 14*a* of the barrel 14. For example, the molding material (for example, a resin material in the form of pellets) is fed into the internal bore 14*a* via the hole 28 using a hopper (not shown). In the metering process of the molding cycle, the controller 64 controls the servomotor 60 and the servomotor 62 to cause the screw 82 to rotate and move backward, thereby metering the molding material. During the metering, the screw 82 moves backward while rotating, whereby the screw 82 feeds the molding material inside the internal bore 14*a* to the internal bore 80*a* (the space 70) of the nozzle 80 located forward thereof, along the groove of the screw 82. After completion of the metering process, the controller 64 brings the nozzle 80 into contact with the mold by moving the entire injection device 12 forward. Thereafter, the controller 64 performs injection control. That is, the controller 64 controls the servomotor 62 to move the screw 82 forward, whereby the controller 64 causes the molding material in the space 70 to be injected from the front end of the nozzle hole 80*c* toward the mold.

The seal housing 24 is fixed to the barrel 14 disposed rearward of the hole 28 (feed throat). Here, the barrel 14 is separable into a first member 142 on the front side and a second member 144 on the rear side along the axial direction. The seal housing 24 is accommodated, in an insertable and removable manner, in an accommodating bore 14*b* (fourth accommodating bore) formed in the rear end portion of the first member 142. Further, the seal housing 24 is held in the accommodating bore 14*b* by the front end portion of the second member 144. The first member 142 and the second member 144 are fastened to each other by bolts or the like (not shown).

The seal 72 can be removed from the injection device 12 as follows. First, by separating the first member 142 and the second member 144 of the barrel 14 from each other, for example, the rear end of the seal housing 24 is exposed from the rear end of the first member 142. Thereafter, the removal bolt is screwed into the internally threaded portion 24*d* of the seal housing 24, and the removal bolt is pulled. This makes it possible to remove the seal 72 from the first member 142 together with the seal housing 24.

Since the third embodiment is substantially the same as the first and second embodiments except for the above features, a detailed description thereof will be omitted.

Modification 1

Figure 6:
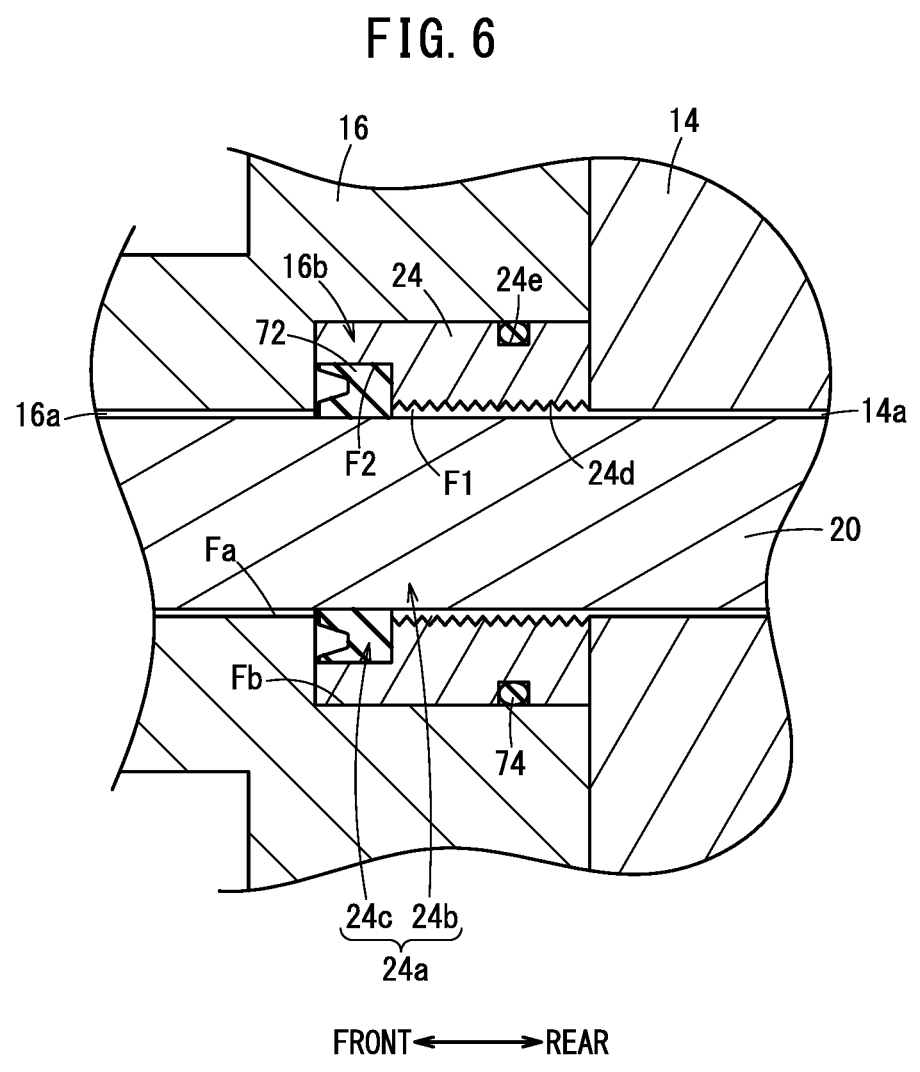

Hereinafter, the seal housing 24 according to a first modification will be described. FIG. 6 is a view showing the seal housing 24 according to the first modification. As shown in FIG. 6, in the first modification, the internally threaded portion 24*d* is formed on the entire inner surface F1 of the internal bore 24*b* (first internal bore). Thus, even when the seal 72 sticks to the seal housing 24, the seal housing 24 and the seal 72 can be easily separated from each other. That is, the removal bolt is screwed into the internally threaded portion 24*d* of the seal housing 24, and thereafter, the removal bolt is rotated. As a result, by causing the tip of the removal bolt to reach the inside of the internal bore 24*c* (the inside of the second internal bore), the seal 72 can be pushed out from the seal housing 24.

Since the seal housing 24 according to the first modification is the same as the seal housing 24 according to the first to third embodiments except for the above features, a detailed description thereof will be omitted. That is, the seal housing 24 according to the first modification can be applied to any of the first to third embodiments.

Modification 2

Figure 7:
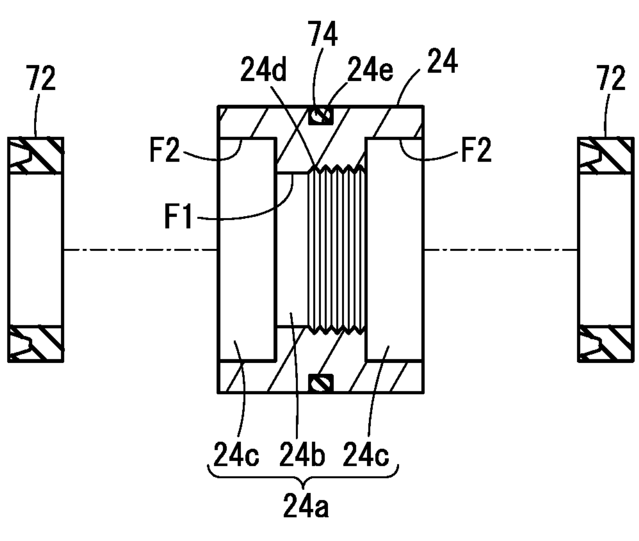
FIG. 7 is a view showing the seal housing according to a second modification.

Hereinafter, the seal housing 24 according to a second modification will be described. FIG. 7 is a view showing the seal housing 24 according to the second modification and shows a state in which the seal 72 and the seal housing 24 are separated from the nozzle adapter 16.

As shown in FIG. 7, the seal housing 24 holds a plurality of seals 72 (here, a front seal and a rear seal, i.e., two seals 72). In addition to the internal bore 24*b* (first internal bore) and the internal bore 24*c* (second internal bore) that is located on the front side, the seal housing 24 includes an internal bore 24*c* (third internal bore) located on the rear side. The rear seal 72 is held in the internal bore 24*c* on the rear side. The internal bore 24*c* on the rear side has a larger inner diameter than the internal bore 24*b*. The internal bore 24*c* on the rear side is coaxial with the internal bore 24*b* and the internal bore 24*c* on the front side. The plurality of seals 72 are held by providing the plurality of internal bores 24*c* for holding the seals 72 therein, and as a result, the backflow prevention function is improved. Here, the seal housing 24 holds two seals 72, but may hold three or more seals 72.

Also in the second modification, the seal 72 can be removed together with the seal housing 24 by screwing the removal bolt into the internally threaded portion 24*d* of the seal housing 24. It should be noted that the rear seal 72 may be removed before the screwing of the removal bolt.

Since the seal housing 24 according to the second modification is the same as the seal housing 24 according to the first to third embodiments except for the above features, a detailed description thereof will be omitted. That is, the seal housing 24 according to the second modification can be applied to any of the first to third embodiments.

Modification 3

Figure 8:
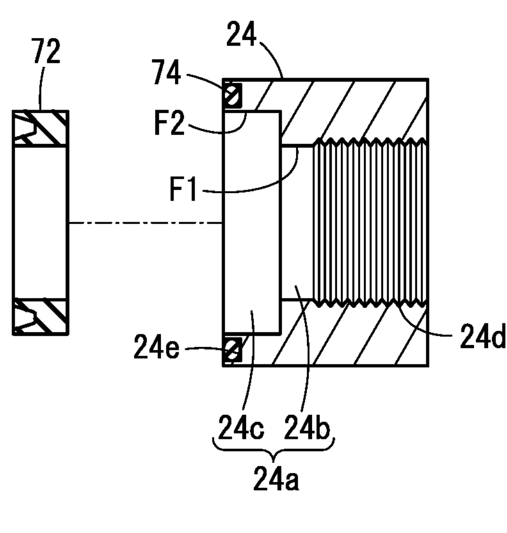
FIG. 8 is a view showing the seal housing according to a third modification.

Hereinafter, the seal housing 24 according to a third modification will be described. FIG. 8 is a view showing the seal housing 24 according to the third modification and shows a state in which the seal 72 and the seal housing 24 are separated from the nozzle adapter 16.

As shown in FIG. 8, in the third modification, the O-ring 74 is provided on the end surface of the seal housing 24. Further, the groove 24*e* for holding the O-ring 74 is formed in the end surface of the seal housing 24. In this manner, the O-ring 74 may be held on the end face of the seal housing 24. The O-ring 74 on the end face of the seal housing 24 contributes to backflow prevention and can be removed together with the seal housing 24.

Here, one O-ring 74 is provided on the end surface of the seal housing 24, but an additional O-ring 74 may be provided. For example, a plurality of the O-rings 74 may be provided on the end surface of the seal housing 24. Further, the O-rings 74 may be provided on both the end surface and the outer circumferential surface of the seal housing 24. As a result, the backflow of the molding material can be more effectively prevented. In this case, by forming a plurality of the grooves 24*e* in the end surface (and the outer circumferential surface) of the seal housing 24, the plurality of O-rings 74 can be held in the plurality of grooves 24*e*, respectively.

Since the seal housing 24 according to the third modification is the same as the seal housing 24 according to the first to third embodiments except for the above features, a detailed description thereof will be omitted. That is, the seal housing 24 according to the third modification can be applied to any of the first to third embodiments.

Modification 4

Figure 9A:
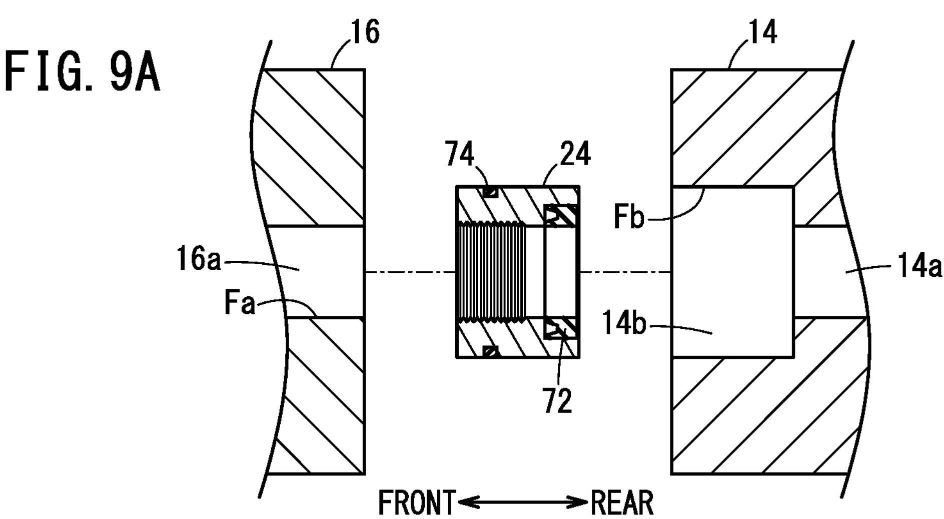
FIG. 9A is a view showing the injection molding machine according to an example of a fourth modification.
Figure 9B:
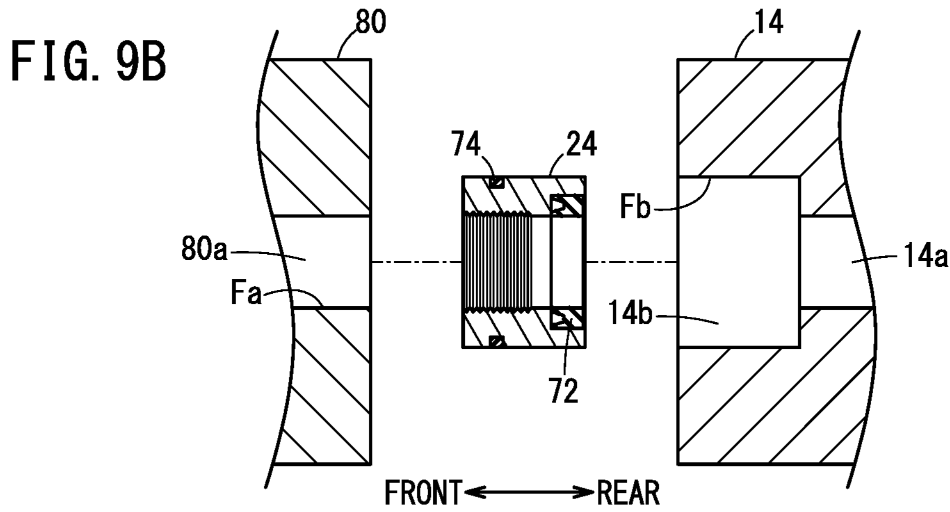
FIG. 9B is a view showing the injection molding machine according to the example of the fourth modification.
Figure 9C:
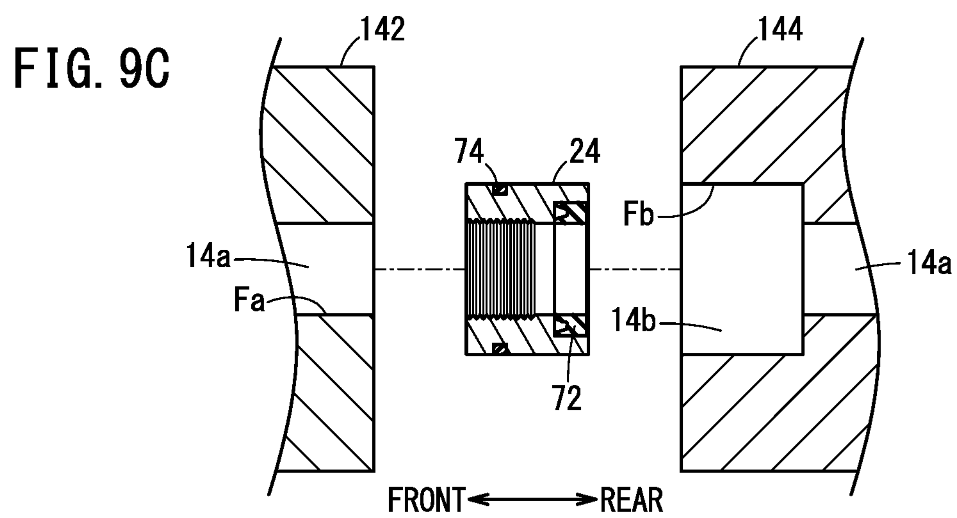
FIG. 9C is a view showing the injection molding machine according to the example of the fourth modification.
Figure 10A:
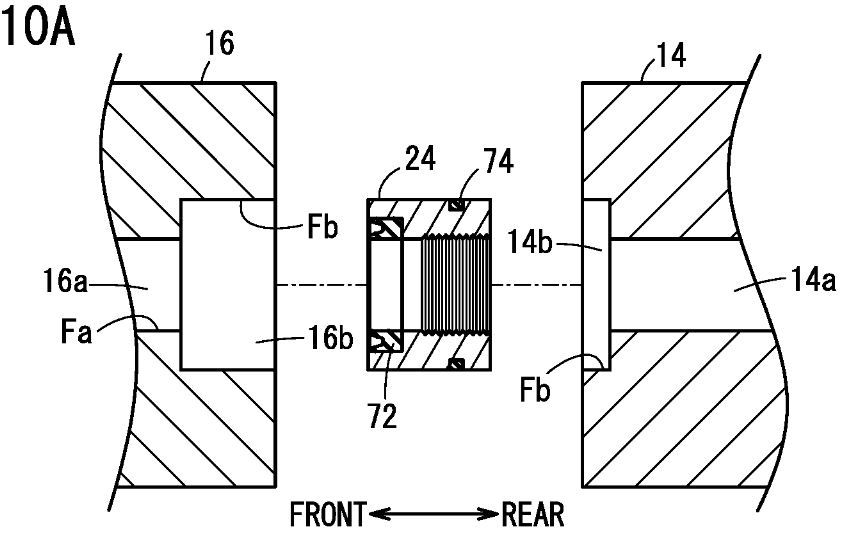
FIG. 10A is a view showing the injection molding machine according to another example of the fourth modification.
Figure 10B:
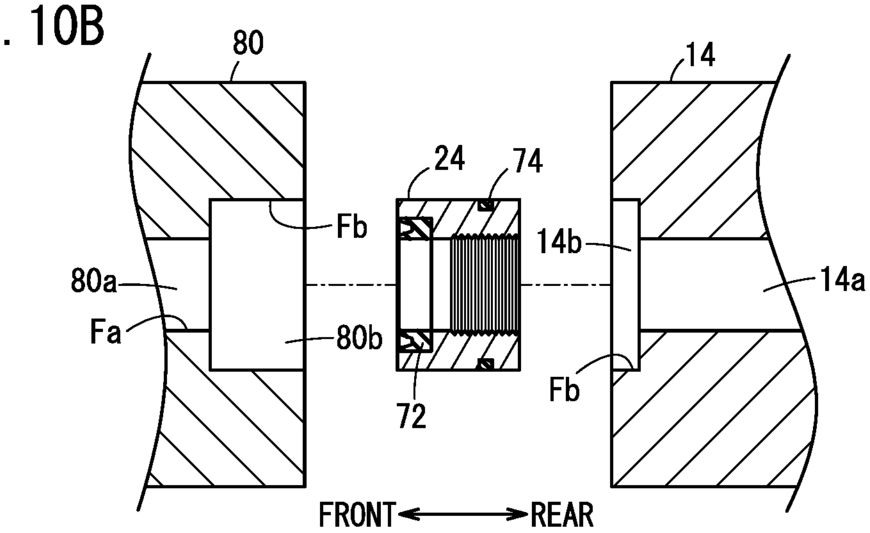
FIG. 10B is a view showing the injection molding machine according to the other example of the fourth modification.
Figure 10C:
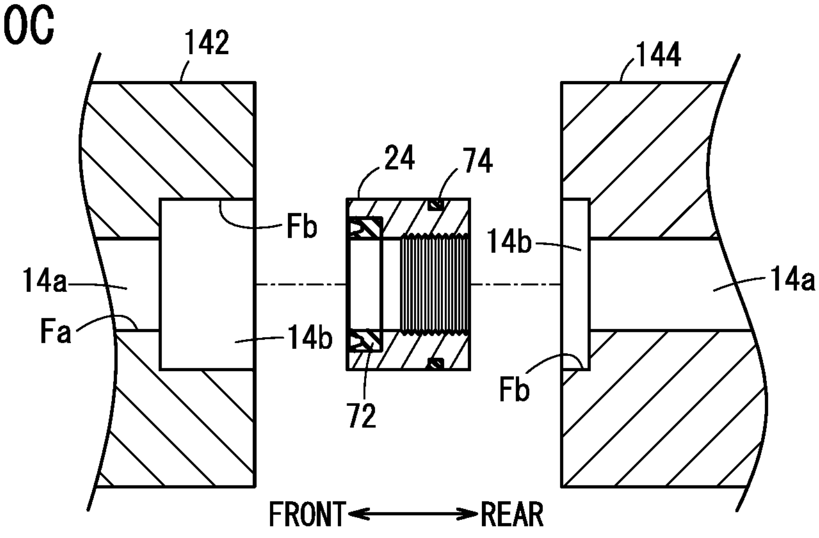
FIG. 10C is a view showing the injection molding machine according to the other example of the fourth modification.

Hereinafter, the injection device 12 according to a fourth modification will be described. FIGS. 9A to 9C are views showing the injection molding machine 10 according to an example of the fourth modification. FIGS. 10A to 10C are views showing the injection molding machine 10 according to another example of the fourth modification.

FIGS. 9A and 10A show a state in which the seal housing 24 is separated from the nozzle adapter 16 in the injection device 12 corresponding to the first embodiment. In FIGS. 9A and 10A, the seal housing 24 is fixed by the barrel 14 and the nozzle adapter 16.

In FIG. 9A, instead of the accommodating bore 16*b* in the first embodiment, the accommodating bore 14*b* (third accommodating bore) is formed in the front end portion of the barrel 14. The seal housing 24 is accommodated, in an insertable and removable manner, in the accommodating bore 14*b* formed in the front end portion of the barrel 14. The seal housing 24 is held in the accommodating bore 14*b* by the rear end portion of the nozzle adapter 16.

In FIG. 10A, the accommodating bore 16*b* (second accommodating bore) is formed in the rear end portion of the nozzle adapter 16, and the accommodating bore 14*b* (third accommodating bore) is formed in the front end portion of the barrel 14. The seal housing 24 is accommodated and held inside the accommodating bore 16*b* and the accommodating bore 14*b*.

In FIG. 10A, the length of the accommodating bore 16*b* is greater than the length of the accommodating bore 14*b*. This is because the seal housing 24 is to be held by the nozzle adapter 16 when the nozzle adapter 16 and the barrel 14 are separated from each other. Note that the seal housing 24 may be held by the nozzle adapter 16 by using another method. Further, the seal housing 24 may be held by the barrel 14. Furthermore, the seal housing 24 may be held by any one of the nozzle adapter 16 or the barrel 14.

FIGS. 9B and 10B show a state in which the seal housing 24 is separated from the nozzle 80 in the injection device 12 corresponding to the second embodiment. In FIGS. 9B and 10B, the seal housing 24 is fixed by the barrel 14 and the nozzle 80.

In FIG. 9B, the accommodating bore 14*b* (third accommodating bore) is formed in the front end portion of the barrel 14. The seal housing 24 is accommodated in the accommodating bore 14*b*. In addition, in FIG. 10B, the accommodating bore 80*b* (first accommodating bore) is formed in the rear end portion of the nozzle 80, and the accommodating bore 14*b* (third accommodating bore) is formed in the front end portion of the barrel 14. The seal housing 24 is accommodated in the accommodating bore 80*b* and the accommodating bore 14*b*.

In FIG. 10B, the length of the accommodating bore 80*b* is greater than the length of the accommodating bore 14*b*. This is because the seal housing 24 is to be held by the nozzle 80 when the nozzle 80 and the barrel 14 are separated from each other. However, the seal housing 24 may be held by the barrel 14. The seal housing 24 may be held by any one of the nozzle 80 or the barrel 14.

FIGS. 9C and 10C show a state in which the seal housing 24 is separated from the barrel 14 (the first member 142 and the second member 144) in the injection device 12 corresponding to the third embodiment. In FIGS. 9C and 10C, the seal housing 24 is fixed by the barrel 14 (the first member 142 and the second member 144).

In FIG. 9C, the accommodating bore 14*b* (fifth accommodating bore) is formed in the front end portion of the second member 144, and the seal housing 24 is accommodated in the accommodating bore 14*b*. Further, in FIG. 10C, two accommodating bores 14*b* (fourth accommodating bore and fifth accommodating bore) are formed in the rear end portion of the first member 142 and the front end portion of the second member 144, and the seal housing 24 is accommodated in the two accommodating bores 14*b*.

In FIG. 10C, the length of the accommodating bore 14*b* of the first member 142 is greater than the length of the accommodating bore 14*b* of the second member 144. This is because the seal housing 24 is to be held by the first member 142 when the first member 142 and the second member 144 are separated from each other. However, the seal housing 24 may be held by the second member 144. The seal housing 24 may be held by any one of the first member 142 or the second member 144.

Since the fourth modification is the same as the first embodiment, the second embodiment, and the third embodiment except for the above features, a detailed description thereof will be omitted.

Modification 5

Hereinafter, the injection device 12 according to a fifth modification will be described. The fifth modification is an appropriate combination of the first to fourth modifications. For example, the first modification and the second modification can be combined. In this case, the seal housing 24 holds the plurality of seals 72, and the internally threaded portion 24*d* is formed on the entire inner surface F1 of the internal bore 24*b* (first internal bore).

Modified Embodiment

The present invention is not limited to the above-described embodiments, and various configurations can be adopted therein without departing from the essence and gist of the present invention.

Invention Obtained from Embodiments

The invention that can be grasped from the above-described embodiments and modifications will be described below.

[1] The injection device (12) according to the present invention is an injection device that performs molding by injecting the molding material into the mold from the nozzle member ([the nozzle 80], [the nozzle adapter 16, the nozzle 18]) provided on the distal end of the barrel (14), the injection device including: the plunger (20) disposed in the internal bore (14*a*) of the barrel and the internal bore (80*a*, 16*a*) of the nozzle member, and movable in the front-rear direction along the axial direction; the feed throat (22) provided in the nozzle member in order for the molding material to be fed into the internal bore of the nozzle member; the seal (72) having an annular shape, provided rearward of the feed throat, and configured to prevent the molding material fed from the feed throat from flowing rearward along the plunger; and the seal housing (24) configured to hold the seal, the seal housing having a tubular shape and an outer diameter larger than the diameter of each of the internal bores. The seal housing is fixed by the barrel and the nozzle attached to the barrel, and includes: the first inner surface (the inner surface F1) forming the first internal bore (the internal bore 24*b*) through which the plunger passes; and the second inner surface (the inner surface F2) forming the second internal bore (internal bore 24*c*) in which the seal is held, the second internal bore having a larger diameter than the first internal bore and being coaxial with the first internal bore. The internally threaded portion (24*d*) having a larger diameter than the plunger is formed in at least a part of the first inner surface. According to this feature, the barrel and the nozzle are separated from each other, the removal bolt is screwed into the internally threaded portion of the seal housing, and the seal can be easily removed together with the seal housing by using the removal bolt.

[2] The nozzle member includes the nozzle (80), and the first accommodating bore (the accommodating bore 80*b*) in which the seal housing is accommodated is formed in the rear end portion of the nozzle in a manner so that the seal housing is insertable into and removable from the rear end portion of the nozzle. According to this feature, the seal can be easily removed from the rear end portion of the nozzle together with the seal housing.

[3] The nozzle member includes the nozzle adapter (16) provided at the distal end of the barrel, and the nozzle (18) provided at the distal end of the nozzle adapter, the plunger is disposed in the internal bore (14*a*) of the barrel and the internal bore (16*a*) of the nozzle adapter, and the feed throat is provided in the nozzle adapter in order for the molding material to be fed into the internal bore of the nozzle adapter. The seal housing is fixed by the barrel and the nozzle adapter. According to this feature, the barrel and the nozzle are separated from each other, the removal bolt is screwed into the internally threaded portion of the seal housing, and the seal can be easily removed together with the seal housing by using the removal bolt.

[4] The second accommodating bore (the accommodating bore 16*b*) in which the seal housing is accommodated is formed in the rear end portion of the nozzle adapter in a manner so that the seal housing is insertable into and removable from the rear end portion of the nozzle adapter. According to this feature, the seal can be easily removed from the rear end portion of the nozzle adapter together with the seal housing.

[5] The third accommodating bore (the accommodating bore 14*b*) in which the seal housing is accommodated is formed in the front end portion of the barrel in a manner so that the seal housing is insertable into and removable from the front end portion of the barrel. According to this feature, the seal can be easily removed from the front end portion of the barrel together with the seal housing.

[6] The injection device according to the present invention is an injection device that performs molding by injecting the molding material into the mold from the nozzle (80) provided on the distal end of the barrel, the injection device including: the screw (82) disposed in the internal bore of the barrel, and movable in the front-rear direction along the axial direction; the feed throat (the hole 28) provided in the barrel in order for the molding material to be fed into the internal bore of the barrel; the seal having an annular shape, provided rearward of the feed throat, and configured to prevent the molding material fed from the feed throat from flowing rearward along the screw; and the seal housing configured to hold the seal, the seal housing having a tubular shape and an outer diameter larger than the diameter of the internal bore of the barrel. The seal housing is fixed by the barrel and includes: the first inner surface forming the first internal bore through which the screw passes; and the second inner surface forming the second internal bore in which the seal is held, the second internal bore having a larger diameter than the first internal bore and being coaxial with the first internal bore. The internally threaded portion having a larger diameter than the screw is formed in at least a part of the first inner surface. According to this feature, the removal bolt is screwed into the internally threaded portion of the seal housing, and the seal can be easily removed together with the seal housing by using the removal bolt.

[7] The barrel is separable into the first member (142) on the front side and the second member (144) on the rear side along the axial direction, and the fourth accommodating bore (the accommodating bore 14*b*) in which the seal housing is accommodated is formed in the rear end portion of the first member in a manner so that the seal housing is insertable into and removable from the rear end portion of the first member. According to this feature, the seal can be easily removed from the rear end portion of the first member of the barrel together with the seal housing.

[8] The barrel is separable into the first member on the front side and the second member on the rear side along the axial direction, and the fifth accommodating bore (the accommodating bore 14*b*) in which the seal housing is accommodated is formed in the front end portion of the second member in a manner so that the seal housing is insertable into and removable from the front end portion of the second member. According to this feature, the seal can be easily removed from the front end portion of the second member of the barrel together with the seal housing.

[9] The injection device includes the O-ring (74) configured to prevent the molding material from flowing rearward from between the outer circumferential surface of the seal housing and the inner surface (Fb) of any one of the first accommodating bore, the second accommodating bore, the third accommodating bore, the fourth accommodating bore, or the fifth accommodating bore (14*b*, 16*b*, 80*b*), and the groove (24*e*) configured to hold the O-ring is formed in the outer circumferential surface or the end surface of the seal housing. According to this feature, leakage of the molding material from between the accommodating bore and the outer circumferential surface of the seal housing can be prevented by using the O-ring held by the seal housing.

[10] The internally threaded portion is formed on the entire surface of the first internal bore. According to this feature, by screwing the removal bolt into the internally threaded portion of the seal housing, the seal held in the second internal bore of the seal housing can be pushed out from the seal housing.

[11] The injection device includes the second seal (the seal 72) having an annular shape, provided rearward of the feed throat, and configured to prevent the molding material fed from the feed throat from flowing rearward along the plunger or the screw. The seal housing includes the third internal bore (the internal bore 24*c*) in which the second seal is held, the third internal bore having a larger diameter than the first internal bore, and being coaxial with the first internal bore and the second internal bore.

The invention claimed is:

1. An injection device that performs molding by injecting molding material into a mold from a nozzle member provided at a distal end of a barrel, the injection device comprising:

a plunger disposed in an internal bore of the barrel and an internal bore of the nozzle member, and movable in a front-rear direction along an axial direction;

a feed throat provided in the nozzle member in order for the molding material to be fed into the internal bore of the nozzle member;

a seal having an annular shape, provided rearward of the feed throat, and configured to prevent the molding material fed from the feed throat from flowing rearward along the plunger; and a seal housing configured to be accommodated in a rear end portion of the nozzle member rearward of the feed throat and hold the seal between the seal housing and the plunger, the seal housing having a tubular shape and an outer diameter larger than a diameter of each of the internal bores, wherein the seal housing is fixed by a front end portion of the barrel and the rear end portion of the nozzle member attached to the barrel, both the front end portion of the barrel and the rear end portion of the nozzle member facing to the seal housing in the axial direction, and includes: a first inner surface forming a first internal bore through which the plunger passes; and a second inner surface forming a second internal bore in which the seal is held, the second internal bore having a larger diameter than the first internal bore and being coaxial with the first internal bore, and an internally threaded portion having a larger diameter than the plunger is formed in at least a part of the first inner surface, wherein the internally threaded portion is configured to couple and de-couple with a screw bolt.

2. The injection device according to claim 1, wherein the nozzle member includes a nozzle, and a first accommodating bore in which the seal housing is accommodated is formed in a rear end portion of the nozzle in a manner so that the seal housing is insertable into and removable from the rear end portion of the nozzle.

3. The injection device according to claim 1, wherein the nozzle member includes a nozzle adapter provided at a distal end of the barrel, and a nozzle provided at a distal end of the nozzle adapter, the plunger is disposed in the internal bore of the barrel and an internal bore of the nozzle adapter, the feed throat is provided in the nozzle adapter in order for the molding material to be fed into the internal bore of the nozzle adapter, and the seal housing is fixed by the barrel and the nozzle adapter.

4. The injection device according to claim 3, wherein a second accommodating bore in which the seal housing is accommodated is formed in a rear end portion of the nozzle adapter in a manner so that the seal housing is insertable into and removable from the rear end portion of the nozzle adapter.

5. The injection device according to claim 1, wherein a third accommodating bore in which the seal housing is accommodated is formed in a front end portion of the barrel in a manner so that the seal housing is insertable into and removable from the front end portion of the barrel.

6. The injection device according to claim 2, further comprising an O-ring configured to prevent the molding material from flowing rearward from between an outer circumferential surface of the seal housing and an inner surface of the first accommodating bore, wherein a groove configured to hold the O-ring is formed in the outer circumferential surface or an end surface of the seal housing.

7. The injection device according to claim 1, wherein the internally threaded portion is formed on an entire surface of the first internal bore.

8. The injection device according to claim 1, wherein the injection device includes a second seal having an annular shape, provided rearward of the feed throat, and configured to prevent the molding material fed from the feed throat from flowing rearward along the plunger, and the seal housing includes a third internal bore in which the second seal is held, the third internal bore having a larger diameter than the first internal bore, and being coaxial with the first internal bore and the second internal bore.

9. The injection device according to claim 2, wherein a third accommodating bore in which the seal housing is accommodated is formed in a front end portion of the barrel in a manner so that the seal housing is insertable into and removable from the front end portion of the barrel.

10. The injection device according to claim 4, wherein a third accommodating bore in which the seal housing is accommodated is formed in a front end portion of the barrel in a manner so that the seal housing is insertable into and removable from the front end portion of the barrel.

11. The injection device according to claim 4, further comprising an O-ring configured to prevent the molding material from flowing rearward from between an outer circumferential surface of the seal housing and an inner surface of the second accommodating bore, wherein a groove configured to hold the O-ring is formed in the outer circumferential surface or an end surface of the seal housing.

12. The injection device according to claim 5, further comprising an O-ring configured to prevent the molding material from flowing rearward from between an outer circumferential surface of the seal housing and an inner surface of the third accommodating bore, wherein a groove configured to hold the O-ring is formed in the outer circumferential surface or an end surface of the seal housing.

* * * * *